United States Patent
Wunderer

(10) Patent No.: US 12,460,548 B2
(45) Date of Patent: Nov. 4, 2025

(54) BLADING ASSEMBLY FOR A TURBOMACHINE AND TURBOMACHINE

(71) Applicant: MTU Aero Engines AG, Munich (DE)

(72) Inventor: Roland Wunderer, Haimhausen (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 18/883,095

(22) Filed: Sep. 12, 2024

(65) Prior Publication Data
US 2025/0101871 A1    Mar. 27, 2025

(30) Foreign Application Priority Data
Sep. 27, 2023   (DE) .......................... 102023126341.2

(51) Int. Cl.
F01D 5/14      (2006.01)
B23P 15/02     (2006.01)
F01D 9/04      (2006.01)

(52) U.S. Cl.
CPC .............. *F01D 5/141* (2013.01); *B23P 15/02* (2013.01); *F01D 5/143* (2013.01); *F01D 5/145* (2013.01); *F01D 9/041* (2013.01); *F05D 2230/10* (2013.01); *F05D 2230/30* (2013.01); *F05D 2240/121* (2013.01); *F05D 2240/122* (2013.01); *F05D 2240/303* (2013.01);
(Continued)

(58) Field of Classification Search
CPC .......... F01D 5/141; F01D 5/143; F01D 5/145; F05D 2230/10; F05D 2230/30; F05D 2240/121; F05D 2240/122; F05D 2240/303; F05D 2240/304; F05D 2240/80; Y02T 50/60
See application file for complete search history.

(56) References Cited

U.S. PATENT DOCUMENTS

| 7,134,842 B2 | 11/2006 | Tam et al. |
| 8,459,956 B2 * | 6/2013 | Pandey .................. F01D 5/143 |
| | | 416/223 R |
| 8,720,207 B2 | 5/2014 | Gersbach et al. |

(Continued)

FOREIGN PATENT DOCUMENTS

| EP | 1199439 A2 | 4/2002 |
| EP | 2631429 A1 * | 8/2013 .............. B23P 15/02 |

(Continued)

OTHER PUBLICATIONS

Reising:"Steady and Unsteady Performance of a Transonic Compressor Stage with Non-Axisymmetric End Walls," Fachgebiet für Gasturbinen, Luft- und Raumfahrtantriebe Technische Universität Darmstadt, Jul. 2010 (tu-darmstadt.de).

*Primary Examiner* — Brian Christopher Delrue
(74) *Attorney, Agent, or Firm* — Davidson Kappel LLC

(57) ABSTRACT

A blading assembly (21) for a turbomachine, and to a turbomachine having improved flow characteristics. The blading assembly (21) has an endwall (1) on which a plurality of airfoils are formed adjacent one another, each airfoil (20) of the plurality of airfoils having a leading edge (2), a trailing edge (3), a chord (c), a pressure side (4), and a suction side (5); the endwall (1) having, between adjacent airfoils (20), a depression (11) in a region (6) of the pressure side (4) and a first thickened area (10) in a region (7) of the suction side (5). The first thickened area (10) begins at a point at least 10% of the chord (c) away from the leading edge (2).

19 Claims, 4 Drawing Sheets

(52) U.S. Cl.
CPC .... *F05D 2240/304* (2013.01); *F05D 2240/80* (2013.01); *Y02T 50/60* (2013.01)

(56) References Cited

U.S. PATENT DOCUMENTS

| | | | |
|---|---|---|---|
| 8,807,930 | B2 | 8/2014 | Green et al. |
| 9,085,985 | B2* | 7/2015 | Barr ........................ F01D 5/145 |
| 9,140,128 | B2 | 9/2015 | Aggarwala et al. |
| 9,194,235 | B2* | 11/2015 | Wunderer ............... B23P 15/02 |
| 9,963,973 | B2* | 5/2018 | Wunderer ............... F01D 5/143 |
| 10,458,248 | B2* | 10/2019 | Wolfrum ................... F01D 5/02 |
| 2006/0140768 | A1* | 6/2006 | Tam ........................ F01D 5/143 |
| | | | 416/193 A |
| 2007/0258818 | A1 | 11/2007 | Allen-Bradley et al. |
| 2012/0051930 | A1* | 3/2012 | Pandey ................... F01D 5/145 |
| | | | 416/223 A |
| 2015/0107265 | A1* | 4/2015 | Smith ..................... F01D 5/143 |
| | | | 60/805 |
| 2016/0108734 | A1* | 4/2016 | Wunderer ............... F01D 9/041 |
| | | | 416/235 |
| 2017/0089203 | A1* | 3/2017 | Lohaus ................... F01D 5/147 |
| 2017/0159443 | A1* | 6/2017 | Pernleitner ............. F01D 5/145 |
| 2017/0159444 | A1 | 6/2017 | Wolfrum et al. |
| 2017/0218769 | A1* | 8/2017 | Venugopal ............. F01D 5/145 |
| 2019/0128118 | A1* | 5/2019 | Hiernaux ............. F04D 29/681 |
| 2019/0128122 | A1* | 5/2019 | Hiernaux ................ F01D 9/041 |

FOREIGN PATENT DOCUMENTS

| | | | |
|---|---|---|---|
| EP | 2631429 | B1 | 5/2016 |
| EP | 3064706 | A1 | 9/2016 |
| EP | 102015224376 | A1 | 6/2017 |
| EP | 3477050 | B1 | 3/2022 |

* cited by examiner

BLADING ASSEMBLY FOR A TURBOMACHINE AND TURBOMACHINE

This claims priority to German Patent Application DE 102023126341.2, filed on Sep. 27, 2023, the entire disclosure of which is hereby incorporated by reference herein.

The invention relates to a blading assembly for a turbomachine and to an associated turbomachine, in particular a gas turbine.

BACKGROUND

An airfoil passage of a turbomachine is generally defined by a hub-side endwall and a casing-side endwall, as well as stator vanes or rotor blades disposed therebetween. The endwalls may be fixed relative to the hub or fixed relative to the casing, respectively. Due to the effect of wall friction, secondary flows, in some cases strongly pronounced ones, may occur the airfoil passages in the region of the endwalls. These secondary flows cause increased losses.

A substantial portion of the flow losses in a turbomachine is generated in the airfoil passages in the region of the endwalls. This region is dominated by secondary flows. Measures to reduce these losses are, firstly, 3D shaping of the airfoils near the endwalls and, secondly, contouring of the endwalls themselves in the region between circumferentially adjacent airfoils. Both measures are intended to improve flow guidance in the region of the endwalls, thereby reducing secondary flow and thus flow losses.

SUMMARY OF THE INVENTION

Meanwhile, there is a wide variety of solutions for shaping endwalls in turbomachines. However, it is still very challenging to find individual solutions that both lead to maximum loss reduction at the design point of the turbomachine and also function well in off-design operating ranges and have no negative effects on the flow in the turbomachine there. There is a significant need to further improve the shaping of endwalls.

U.S. Pat. No. 9,963,973 B2 and EP 2 631 429 B1 both disclose a blading assembly for a turbomachine having an endwall that has a depression on a pressure side of the airfoil and a thickened area on a suction side of the airfoil.

U.S. Pat. No. 7,134,842 B2 describes an endwall with a bulge on the pressure side and an indentation on the suction side. The U.S. Pat. No. 9,140,128 B2 shows a trough in the endwall in the middle between two airfoils, as well as an elevation at the leading edge of the airfoil.

It is an object of the invention to provide an improved blading assembly for a turbomachine, as well as an improved turbomachine.

A first aspect of the invention provides a blading assembly for a turbomachine. The blading assembly has at least one endwall on which a plurality of airfoils are formed, in particular circumferentially, adjacent one another. Each airfoil of the plurality of airfoils defines in particular a leading edge, a trailing edge, a chord line, a pressure side, and a suction side. The endwall between adjacent airfoils has, in particular, a depression in a region of the pressure side and a first thickened area in a region of the suction side. The first thickened area begins in particular at a point at least 10% of the chord away from the leading edge.

By way of this targeted and combined formation of thickened areas and indentations of the endwall in the pressure-side and suction-side regions, with the first thickened area beginning at a point at least 10% of the chord, it has been found that an advantageous local adaptation of the static pressure and of the flow velocity can be achieved, whereby secondary flows can be advantageously influenced and flow losses can be reduced. In addition to the reduction in losses in the airfoil channels over a large operating range of turbomachines, another advantage of this configuration may be an enlargement of the operating range of turbomachines. Yet another advantage may lie in a simple design implementation and/or in the applicability to existing turbomachine designs.

In the context of the present invention, the term "blading assembly" is used to refer in particular to an array of rotor blades and/or an array of stator vanes, in particular of one or more stages. The blading assembly according to the invention is particularly suitable for compressors, in particular high-pressure compressors, as well as for turbines.

In the context of the present invention, an endwall may be on the hub or rotor side and/or on the casing side and may be fixed relative to the hub or rotor and/or relative to the casing. An endwall may include, for example, the radially inner peripheral surface of a rotor blade array and/or the radially outer peripheral surface of a rotor blade array. The peripheral surfaces may be formed, in particular, by a shroud fixed relative to the hub or an inner surface fixed relative to the casing. Similarly, an endwall may include the casing-side, radially outer peripheral surface and/or the hub-side peripheral surface of a stator vane array, which peripheral surface may be formed, in particular, by a shroud fixed relative to the casing or an outer surface fixed relative to the hub.

In the context of the present invention, an indentation is understood in particular to be a region of the endwall that is offset radially inwardly into the endwall relative to other regions of the endwall, while a thickened area or elevation is understood in the context of the present invention in particular to be a region of the endwall that protrudes radially from the endwall relative to other regions of the endwall. In the context of the present invention, an indentation or a thickened area may respectively be recessed or protrude inwardly or outwardly relative to an, in particular straight or curved, conical reference surface which is concentric with an axis of rotation. The conical reference surface may extend in particular through the radially innermost or radially outermost points of the endwall or therebetween. In particular, a radius of the conical reference surface may correspond to the average of the maximum and minimum or all radial extents of the endwall. Furthermore, the indentation or thickened area may also be relative to a conical reference surface that extends through a region of the endwall or an airfoil root or an airfoil tip.

In the context of the present invention, a thickened area can in particular be understood to be an elevation, as compared to a depression and, correspondingly, an indentation can be understood to be a depression, as compared to a thickened area. In other words, an airfoil passage between two adjacent airfoils is narrowed by the thickened area and widened by a depression.

From a point of view inside the channel through which the flow passes, the thickened area extends inwardly. Thus, a thickened area on the hub side extends radially positively and a thickened area on the casing side radially negatively from the endwall. From a point of view inside the channel through which the flow passes, the depression extends outwardly. Thus, a depression on the hub side extends radially negatively and a depression on the casing side radially positively from the endwall.

A depression may be formed, for example, by removing material from the endwall surface, for example by means of a milling machine. A thickened area may be formed, for example, by depositing material onto an endwall surface.

If one considers, for example, an endwall that is sinusoidally-wavy in the circumferential direction, the hills and valleys represent thickened areas and depressions relative to the mean line in accordance with the present invention. Similarly, one may assume a conical reference surface through the maximum or minimum radial amplitudes of the sinusoidally-wavy endwall. Here too, the valleys (hills) represent indentations (thickened areas) relative to this conical reference surface, the hills (valleys) represent thickened areas (indentations), since they are located radially further outward (inward) relative thereto.

Adjacent airfoils are to be understood in particular to be airfoils which are formed adjacent to one another in the circumferential direction. In particular, a pressure side of a first airfoil faces a suction side of an adjacent, second airfoil. The region of the first thickened area as well as the region of the depression are formed in particular in the endwall between the pressure side of the first airfoil and the suction side of the second airfoil. The regions may, for example, be adjacent to each other or merge into each other.

The region of the pressure side is to be understood, in particular, as a region on the endwall between adjacent airfoils, which region can be associated with or adjoins the pressure side of the respective airfoil. The region of the suction side is to be understood, in particular, as a region on the endwall between adjacent airfoils, which region can be associated with or adjoins the suction side of the respective airfoil.

A chord line of the respective airfoil is in particular the imaginary connecting line between the upstream leading or inlet edge and the downstream trailing or exit edge of the airfoil. The chord may correspond in particular to the length of the chord line. Percentages given in relation to the chord may correspond in particular to indications of position in the axial direction or in the direction of the chord line. For example, 0% of the chord corresponds to the axial position of the leading edge, 100% of the chord corresponds to the axial position of the trailing edge, and 50% corresponds to an axial position midway between the leading edge and the trailing edge.

The first thickened area preferably begins at a point at least 10% of the chord. In other words, the beginning of the first thickened area is at least 10% of a length of the chord in the axial direction away from the leading edge. In preferred variants, the first thickened area begins at a point at least 15%, 20%, 25%, 30%, 35%, 40%, 45%, or 50% of the chord. The first thickened area extends substantially downstream from this starting position. Alternatively, the thickened area may begin at a point at least 5% of the chord.

Preferably, the depression or the first thickened area extends over an axial length of at least 10%, preferably at least 30%, in particular at least 50%, 60%, 70% 80%, 90%, 100%, or more than 100%, in particular up to 130% of a length of the chord.

One embodiment provides that an extent of the depression of the endwall is greater than an extent of the first thickened area. In this manner, it has been found that secondary flows can be advantageously influenced and flow losses can be reduced. In particular, an axial extent of the depression in the endwall is greater than an axial extent of the first thickened area and/or an extent of the depression in the endwall in the circumferential direction is greater than an extent of the first thickened area in the circumferential direction.

One embodiment provides that a maximum radial depth of the depression in the endwall is greater than a maximum radial height of the first thickened area on the endwall. In this manner, it has been found that secondary flows can be advantageously influenced and flow losses can be reduced.

One embodiment provides that the depression begins upstream of the leading edge. In this manner, it has been found that secondary flows can be advantageously influenced and flow losses can be reduced.

Preferably, the depression begins at a point at least 5%, 10%, 15%, 20%, or 25% of a length of the chord upstream of the leading edge. The depression extends substantially downstream from this starting position.

An alternative embodiment provides that the depression begins at 0% of the chord, i.e., at the axial position of the leading edge, or downstream of the leading edge, or, for example, at 5% or 10% of the chord.

One embodiment provides that a maximum width of the depression is equal to at least 60% of a width of an airfoil passage between adjacent airfoils. In this manner, it has been found that secondary flows can be advantageously influenced and flow losses can be reduced. The maximum width may also be equal to at least 65%, 70%, 75%, or 80% of the width of the airfoil passage.

The airfoil passage may also be referred to as a flow channel for the gas flowing through the turbomachine, which may have a substantially curved shape, but a substantially constant width. The width may extend, in particular, in the circumferential direction.

One embodiment provides that the endwall has a second thickened area that is disposed upstream of the leading edge. In this manner, it has been found that secondary flows can be advantageously influenced and flow losses can be reduced.

One embodiment provides that the second thickened area is disposed between two adjacent depressions, especially if the depression of adjacent airfoils begins upstream of the leading edge. In this manner, it has been found that secondary flows can be advantageously influenced and flow losses can be reduced.

The second thickened area may also be understood as a depression that is less pronounced than the adjacent depressions. In other words, the second thickened area may merely represent a thickened area relative to the adjacent depressions. It is not ruled out that the second thickened area may be a depression relative to the conical reference surface.

An embodiment of the second thickened area provides that a maximum of the second thickened area is located at least approximately at an imaginary tangent or an imaginary extension upstream of a camber line of the airfoil. In this manner, it has been found that secondary flows can be advantageously influenced and flow losses can be reduced.

Preferably, a maximum in the height of the second thickened area may be located at a distance from the leading edge, for example in the form of a bump upstream of the leading edge.

One embodiment provides that a maximum depth of the depression is spaced from the pressure side by a distance of between 20% and 60% of the width of the flow channel between adjacent airfoils, preferably of between 20% and 50%, 20% and 40%, or 20% and 30%, or between 30% and 60%, 40% and 60%, or 50% and 60%. In this manner, it has been found that secondary flows can be advantageously influenced and flow losses can be reduced. The depression in the vicinity of the pressure side may thus preferably be less pronounced than in a more distant region of the pressure side or than between the airfoils.

One embodiment provides that a maximum depth of the depression is in a region between 20% and 65% of the chord line between adjacent airfoils from the pressure side, preferably between 20% and 50%, 20% and 40%, or 20% and 30%, or between 25% and 65%, 35% and 65%, or 45% and 65%, or 55% and 65%. In this manner, it has been found that secondary flows can be advantageously influenced and flow losses can be reduced.

One embodiment provides that the plurality of airfoils are rotors or rotor blades. An alternative embodiment provides that the plurality of airfoils are stators or stator vanes.

One embodiment provides that the plurality of airfoils are compressor airfoils for a turbomachine. An alternative embodiment provides that the plurality of airfoils are turbine airfoils for a turbomachine.

One embodiment provides that the plurality of airfoils have airfoil fillets. It may also be provided that the plurality of airfoils have no airfoil fillets. In particular, the mentioned embodiments of the blading assembly prove advantageous for both airfoils with airfoil fillets and airfoils without airfoil fillets.

Airfoil fillets are bodies with connecting surfaces between the endwall and the airfoil, which have a fillet radius, so that no edge is formed between the endwall and the airfoil.

A second aspect of the invention provides a turbomachine having at least one blading assembly according to the invention.

BRIEF DESCRIPTION OF THE DRAWINGS

Another aspect of the invention is a machining method for producing the blading assembly according to the invention, as well as an additive manufacturing method for producing the blading assembly according to the invention.

Exemplary embodiments of the invention will be described below. To this end.

DETAILED DESCRIPTION

Figure 1:
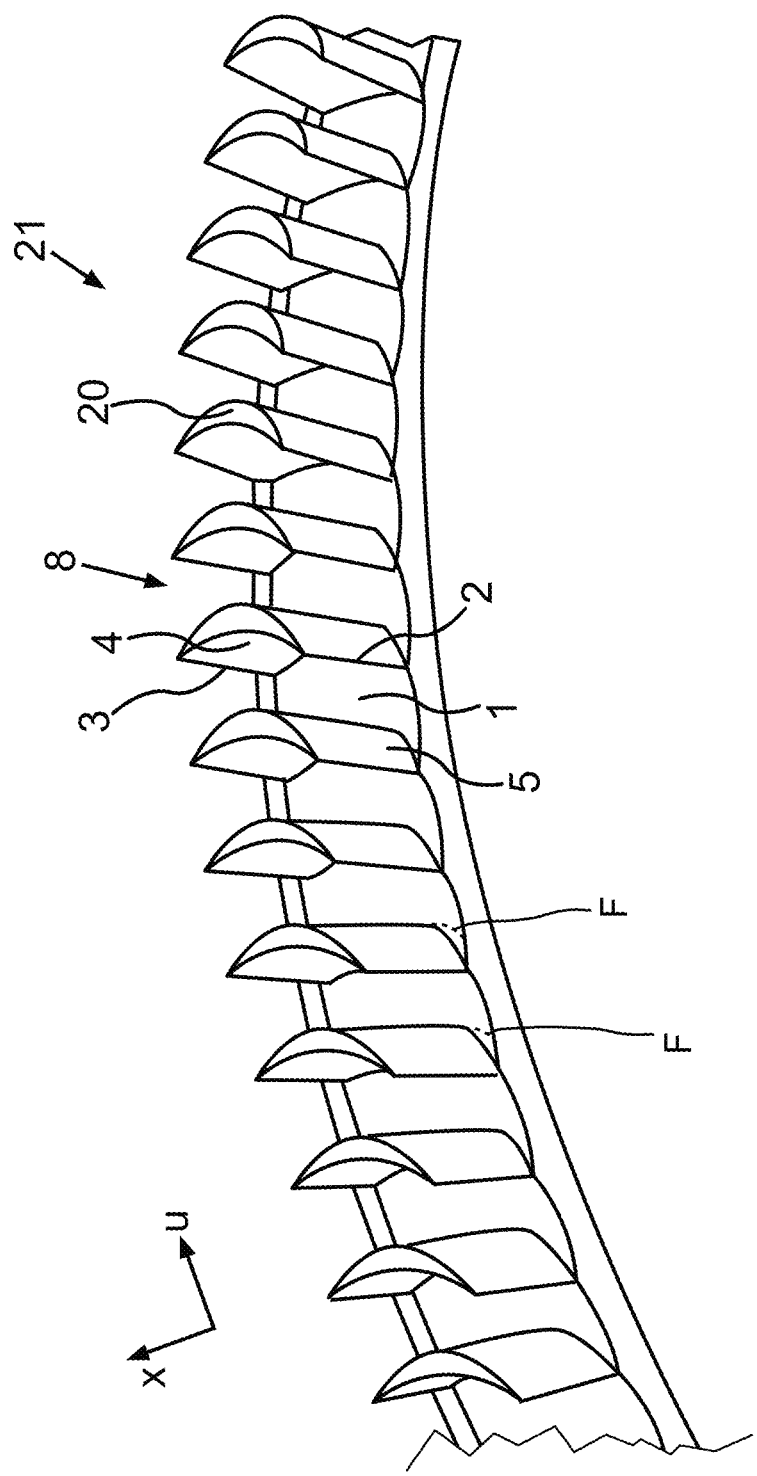
FIG. 1 shows a perspective view of an exemplary embodiment of a blading assembly according to the invention.

The exemplary embodiments described below constitute a preferred embodiment of the invention. In the exemplary embodiments, the described components of the embodiment each represent individual features of the invention which are to be considered independently of each other and which each refine the invention also independently of each other and, therefore, should also be considered to be part of the invention, either individually or in a combination other than the one shown. Furthermore, the embodiment described may also be supplemented by further features of the invention that have already been described. In particular, features of the various exemplary embodiments may be combined with one another.

In the figures, functionally equivalent elements are denoted by the same reference numerals.

FIG. 1 shows, in perspective view, a blading assembly 21, in particular for rotors or stators of a compressor or turbine of a turbomachine, the blading assembly including a hub-side endwall 1 in the hub region of a compressor vane array. FIG. 1 does not show an outer casing wall. On endwall 1, a plurality of airfoils 20 having a leading edge 2, a trailing edge 3, a pressure side 4, and a suction side 5 are arranged adjacent one another in a circumferential direction U. Between adjacent airfoils 20, there is an airfoil passage 8, through which fluid can flow in axial direction X. Fillets F shown solely schematically may be present.

Figure 2:
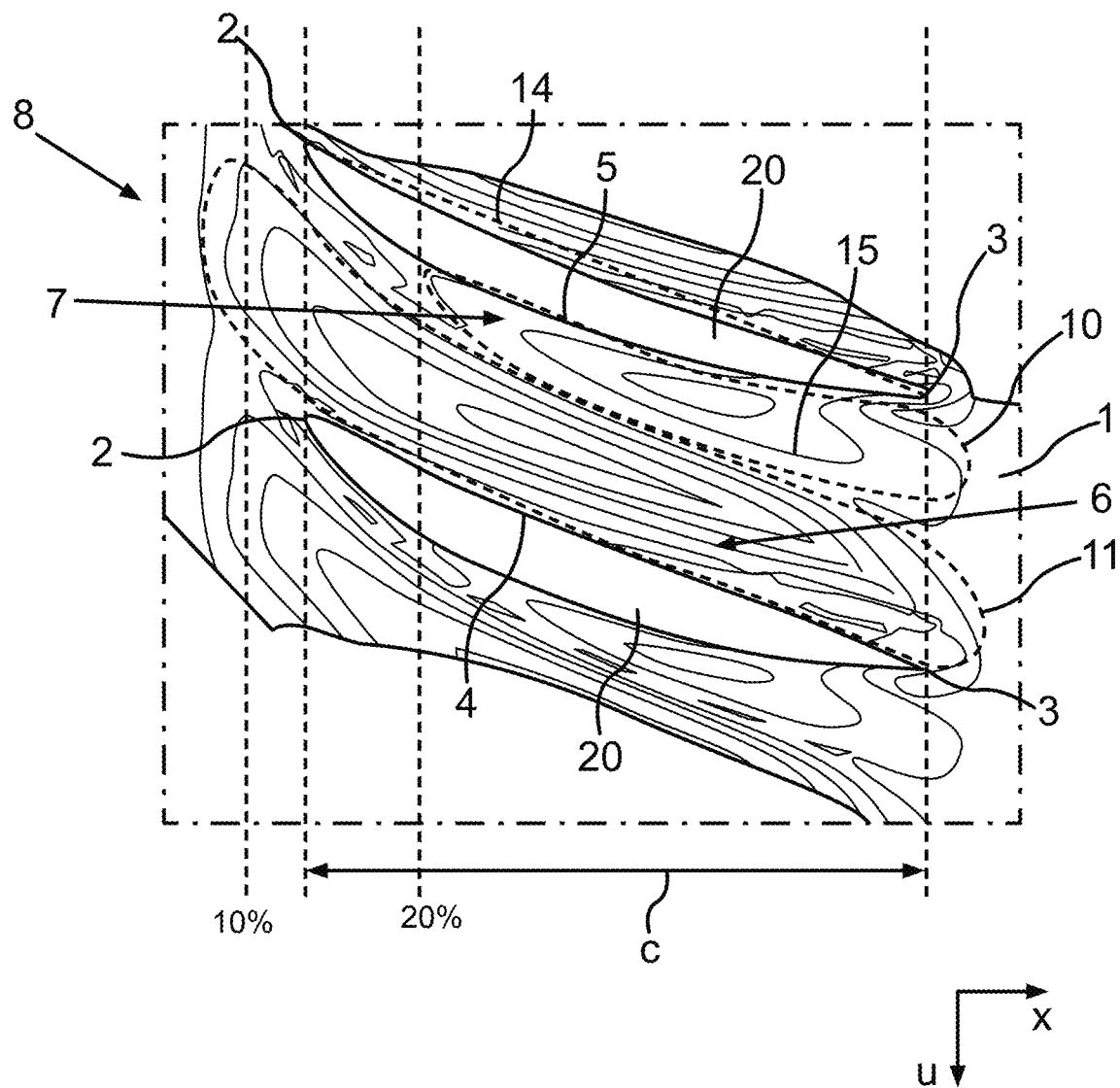
FIG. 2 shows a contour diagram illustrating the contouring of an endwall according to a first exemplary embodiment.

FIG. 2 shows a contour diagram illustrating the contouring of an endwall 1 according to a first exemplary embodiment and showing isolines 15 which represent equal elevation levels of the extent of the endwall contour in the direction orthogonal to endwall 1. Between adjacent airfoils 20, endwall 1 may have a depression 11 in a region 6 of pressure side 4 and a first thickened area 10 in a region 7 of suction side 5. In particular, it may be provided that first thickened area 10 begins at a point at least 10% of chord c away from leading edge 2. In the embodiment shown, first thickened area begins at 20% of chord c.

In particular, in accordance with this exemplary embodiment, the extent of depression 11 is greater than an extent of first thickened area 10, in particular both in axial direction X and in circumferential direction U. Moreover, it can be seen from the number of isolines 15 that a maximum depth of depression 11 is greater than a maximum height of first thickened area 10.

In this example, depression 11 begins upstream of leading edge 2, approximately at a distance of 15% of a length of chord c upstream of leading edge 2. Also, depression 11 has a maximum width in circumferential direction U of at least 60% of a width of airfoil passage 8 between adjacent airfoils 20 in circumferential direction U. A maximum depth of depression 11 is here about 40% of a width of airfoil passage 8 away from pressure side 4 and is in a region of about 25% to 60% of chord c.

Depression 11 and first thickened area 10 may in particular be directly adjacent to one another in airfoil passage 8, so that the thickened area may merge smoothly into depression 11. Both depression 11 and first thickened area 10 may extend substantially elongatedly along axial direction X. In this context, "substantially" is to be understood to mean that the extent in axial direction X may be greater than the extent in circumferential direction U.

Depression 11 and first thickened area 10 may end approximately at the axial position of trailing edge 3, i.e., at about 100% of chord c, or may extend at least slightly beyond trailing edge 3 in the aft direction.

Figure 3:
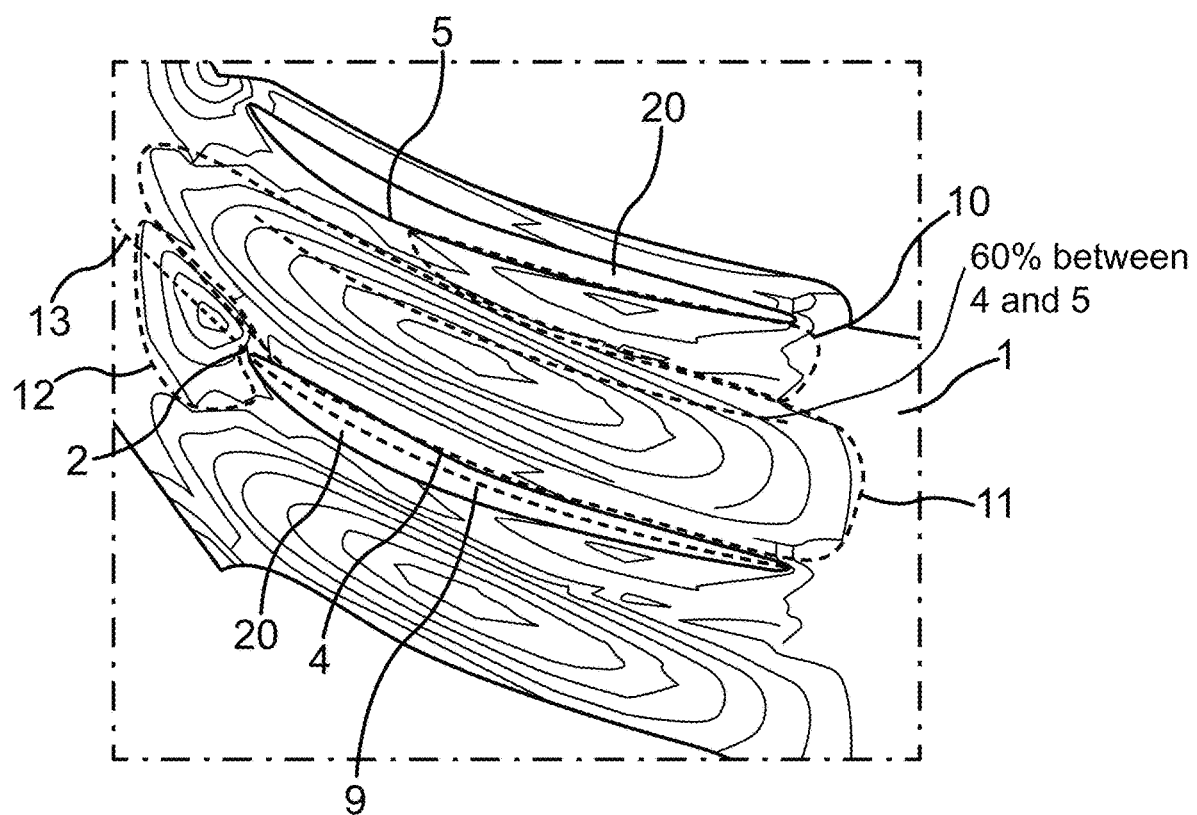
FIG. 3 shows a contour diagram illustrating the contouring of an endwall according to a second exemplary embodiment.

FIG. 3 shows a contour diagram illustrating the contouring of an endwall 1 according to a second exemplary embodiment. As compared to the first example, the extent of depression 11 is more significantly greater than the extent of first thickened area 10. In addition, endwall 1 has a second thickened area 12 that is disposed upstream of leading edge 2. In the example shown, a maximum of second thickened area 12 may be located at least approximately at an imaginary tangent 13 of a camber line 9 of airfoil 20 or at an imaginary upstream extension of camber line 9. In this example, in particular in the constellation where depression 11 begins upstream of leading edge 2, second thickened area 12 may be disposed between two adjacent depressions 11.

Figure 4:
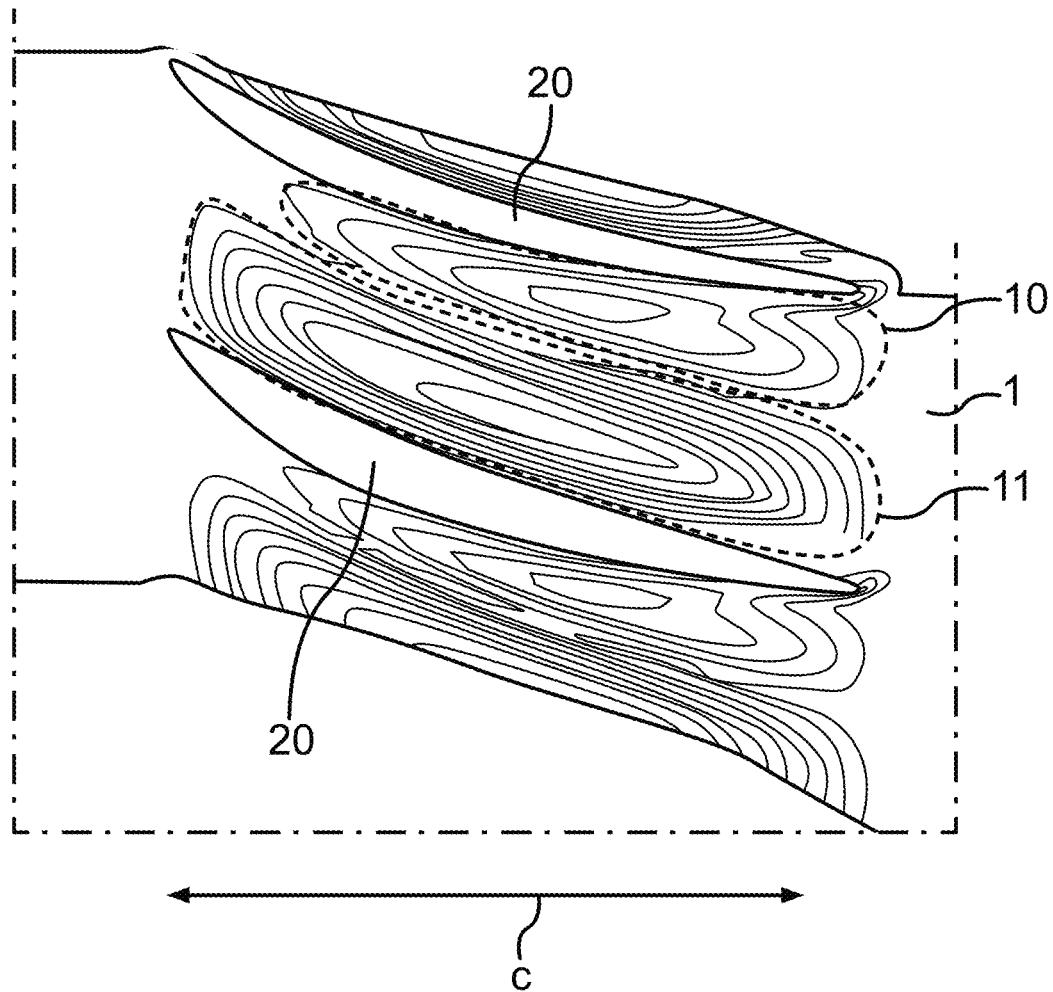
FIG. 4 shows a contour diagram illustrating the contouring of an endwall according to a third exemplary embodiment.

FIG. 4 shows a contour diagram illustrating the contouring of an endwall 1 according to a third exemplary embodiment. Here, the maximum depth of depression 11 may be significantly greater than the maximum height of first thickened area 10. Depression 11 may begin at about 0% of chord c or approximately at the axial position of the leading edge.

LIST OF REFERENCE CHARACTERS 1 endwall
2 leading edge
3 trailing edge
4 pressure side
5 suction side
6 region of the pressure side of the endwall
7 region of the suction side of the endwall
8 airfoil passage
9 camber line
10 first thickened area
11 depression
12 second thickened area
13 tangent
14 chord line
15 isolines
20 airfoil
21 blading assembly
c chord (axial chord length)
U circumferential direction
X axial direction

What is claimed is:

1. A blading assembly for a turbomachine, the blading assembly comprising:
an endwall;
a plurality of airfoils formed adjacent one another on the endwall, each airfoil of the plurality of airfoils having a leading edge, a trailing edge, a chord, a pressure side, and a suction side;
the endwall having, between adjacent airfoils of the plurality of airfoils, a depression in a region of the pressure side and a first thickened area in a region of the suction side,
the first thickened area beginning at a point at least 10% of the chord away from the leading edge;
wherein the depression is spaced from the suction side.

2. The blading assembly as recited in claim 1 wherein an extent of the depression is greater than an extent of the first thickened area.

3. The blading assembly as recited in claim 1 wherein a maximum depth of the depression is greater than a maximum height of the first thickened area.

4. The blading assembly as recited in claim 1 wherein the depression begins upstream of the leading edge.

5. The blading assembly as recited in claim 4 wherein the depression begins a point at least 10% of a length of the chord upstream of the leading edge.

6. The blading assembly as recited in claim 1 wherein the depression begins at 0% of the chord or downstream of the leading edge.

7. The blading assembly as recited in claim 1 wherein a maximum width of the depression is at least 60% of a width of an airfoil passage between the adjacent airfoils.

8. The blading assembly as recited in claim 1 wherein the endwall has a second thickened area disposed upstream of the leading edge.

9. The blading assembly as recited in claim 8 wherein the second thickened area is disposed between two adjacent depressions.

10. The blading assembly as recited in claim 8 wherein a maximum of the second thickened area is located at least approximately at an imaginary tangent of a camber line of one of the adjacent airfoils.

11. The blading assembly as recited in claim 1 wherein a maximum depth of the depression is spaced from the pressure side by a distance of between 20% and 60% of a width of a flow passage between the adjacent airfoils.

12. The blading assembly as recited in claim 1 wherein a maximum depth of the depression is in a region between 20% and 65% of the chord.

13. The blading assembly as recited in claim 1 wherein the plurality of airfoils are rotors or stators.

14. The blading assembly as recited in claim 1 wherein the plurality of airfoils are compressor airfoils or turbine airfoils.

15. The blading assembly as recited in claim 1 wherein the plurality of airfoils have airfoil fillets.

16. A turbomachine comprising the blading assembly as recited in claim 1.

17. The blading assembly as recited in claim 1 wherein the depression starts upstream of the leading edge and ends downstream of the trailing edge and borders the pressure side.

18. The blading assembly as recited in claim 17 wherein the first thickened area starts downstream of the leading edge and ends downstream of the trailing edge and borders the suction side.

19. The blading assembly as recited in claim 1 wherein the first thickened area starts downstream of the leading edge and ends downstream of the trailing edge and borders the suction side.

\* \* \* \* \*